(12) United States Patent
Kim

(10) Patent No.: US 6,282,321 B1
(45) Date of Patent: Aug. 28, 2001

(54) CONTEXT GENERATION CIRCUIT AND METHOD FOR SMALL SCREEN

(75) Inventor: Eui-gyu Kim, Osan (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/206,970

(22) Filed: Dec. 8, 1998

(30) Foreign Application Priority Data

Dec. 26, 1997 (KR) .................................. 97-74473

(51) Int. Cl.[7] ............................. G06K 9/36; H04N 1/41; H03M 7/34
(52) U.S. Cl. ..................... 382/239; 382/247; 358/426; 341/51
(58) Field of Search .................. 382/239, 247, 382/238, 246, 232, 244; 358/430, 426, 261.2; 341/51, 50

(56) References Cited

U.S. PATENT DOCUMENTS

| | | | | |
|---|---|---|---|---|
| 4,982,292 | * | 1/1991 | Itoh et al. | 358/426 |
| 5,297,220 | * | 3/1994 | Nomizu | 382/247 |
| 5,857,035 | * | 1/1999 | Rust | 382/247 |
| 5,886,655 | * | 3/1999 | Rust | 341/107 |
| 5,903,676 | * | 5/1999 | Wu et al. | 382/244 |
| 6,128,412 | * | 10/2000 | Satoh | 382/246 |

FOREIGN PATENT DOCUMENTS

| | | | | |
|---|---|---|---|---|
| 408317226-A | * | 11/1996 | (JP) | H04N/1/417 |
| WO 96/15620 |   | 5/1996 | (WO) | H04N/1/41 |

OTHER PUBLICATIONS

"L.–constrained high–fidelity image compression via adaptive context model," Wu et al., 1997 Data Compression Conference Proceedings, 1997, pp. 91–100.*

* cited by examiner

Primary Examiner—Wenpeng Chen
(74) Attorney, Agent, or Firm—Sughrue, Mion, Zinn, Macpeak & Seas, PLLC

(57) ABSTRACT

A context generation circuit for a small screen, and a method therefor, are provided. The circuit can generate a context with respect to an image that is larger than the horizontal size of a context using two-line and three-line templates, and also combine the position of a modified two-line template or modified three-line template overlapping an input image with the corresponding space in a register. Also, the circuit generates a context by inserting an arithmetic "0" into the position of the modified two-line template or modified three-line template which does not overlap the image. Therefore, an image having a small horizontal size can be effectively processed, and the circuit operates at high speed, and is reliable.

17 Claims, 8 Drawing Sheets

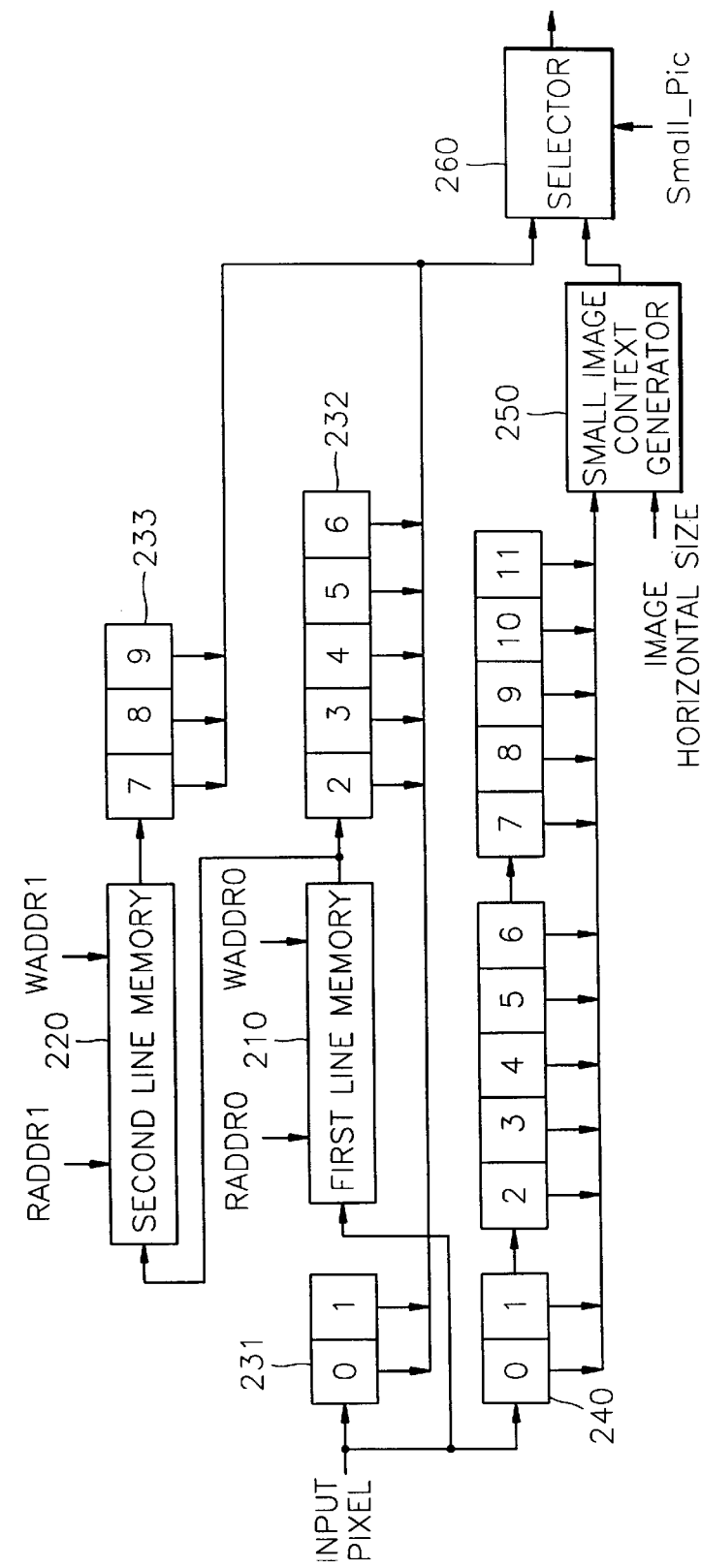

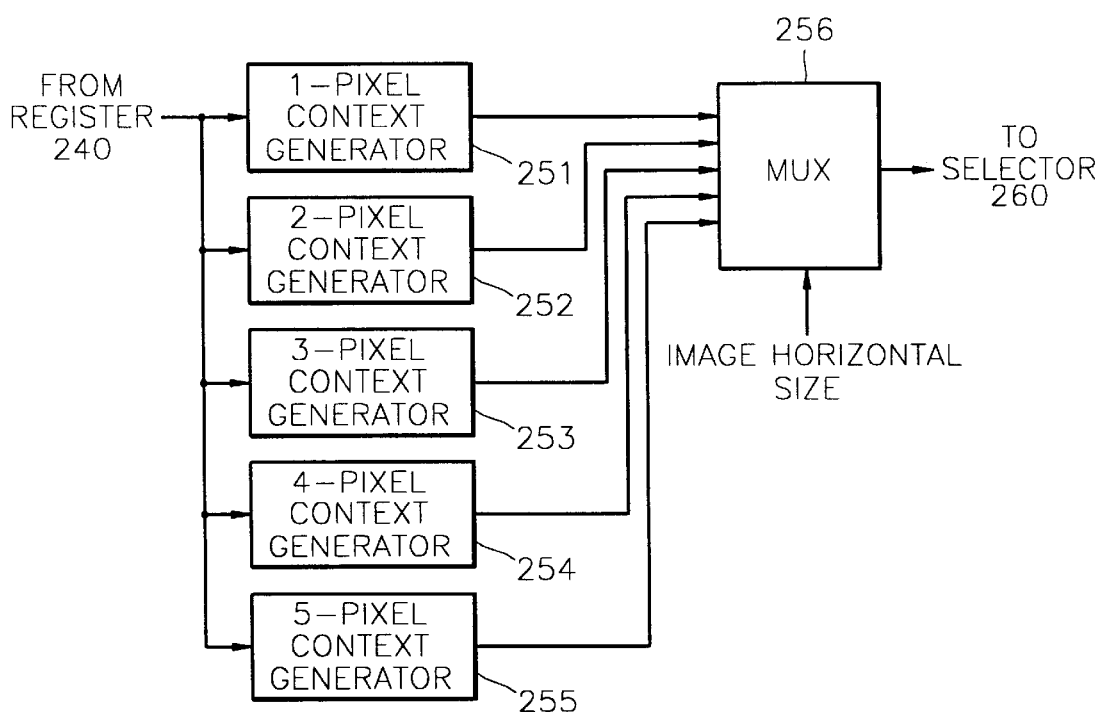

CONTEXT GENERATION CIRCUIT AND METHOD FOR SMALL SCREEN

BACKGROUND OF THE INVENTION

1. Field of the Invention

The present invention relates to a context generation circuit and method in an apparatus for processing a pixel signal of an image using a joint bi-level image experts group (JBIG) standard, and more particularly, to a circuit for efficiently generating a context with respect to a smaller screen than the horizontal size of a context in a JBIG codec, and a method therefor.

2. Description of the Related Art

Coding for compression and extension of an image signal may be lossy coding or lossless coding. The lossless coding is used by a laser beam printer (LBP) or a fax application product to increase the quality of output. A joint bi-level image experts group (JBIG) has been established as a binary image compression/extension standard.

In a pixel signal processing apparatus using the JBIG standard, a current pixel is encoded by adaptively applying a probability according to the values of peripheral pixels, and the encoding can be performed with respect to up to a predetermined number of pixels (several thousand) adopting two-line and three-line templates.

A conventional method and apparatus for processing a pixel signal of an image is disclosed in U.S. Pat. No. 4,982,292. This apparatus includes two image buffers for storing delayed pixel information necessary for generating a context, a window processing unit required according to the shape of a peripheral pixel, a control unit for selecting a window according to the position of a current pixel, and a memory for temporarily storing compressed output information.

That is, information read by an image scanner is stored in the image buffers, and the position of each pixel is determined with respect to the stored pixel information. A window to be applied according to the determined position is selected. A context is generated by peripheral pixels, using the selected window. Used state information is read from a state table by the generated context. The read state information is applied to an arithmetic encoder, thereby accomplishing coding. This operation is performed in multiple layers, and is also similarly applied to application systems of a single layer.

The application field of the aforementioned apparatus refers to a predetermined number of output pixels (several thousand) or more, as in a facsimile, so an extremely small image is not specially considered. Therefore, the conventional apparatus is effective for a screen that is larger than the horizontal size of a context. When high-speed operation is required, the write and read-out speed of image buffers does not satisfy the actual required operation speed, which impedes the high-speed operation.

SUMMARY OF THE INVENTION

To solve the above problems, it is an objective of the present invention to provide a context generation circuit which can process at high speed an image of any size including an image having a horizontal size that is less than that of a context, in a pixel signal processing apparatus using the JBIG.

It is another objective of the present invention to provide a method for generating a context of an image of any size including an input image having a horizontal size that is less than that of a context for state adaptive probability calculation.

Accordingly, to achieve the first objective, there is provided a context generation circuit for a small screen comprising: a first generator for generating a context of a pixel signal of an image that is larger than the horizontal size of the context, using a window selected from a plurality of first windows according to the position of an input pixel; a second generator for generating a context of a pixel signal of an image that is smaller than the horizontal size of the context, using a window selected from a plurality of second windows according to the position of the input pixel; and a selector for selecting the context generated by the second generator if an input image is smaller than the horizontal size of the context, and otherwise selecting the context generated by the first generator.

To achieve the second objective, there is provided a method for generating a context for a small screen comprising the steps of: generating a first context of a pixel signal of an image that is larger than the horizontal size of a context, using a template selected from two-line and three-line templates, in response to a two-line/three-line mode; generating a second context of a pixel signal of an image that is smaller than the horizontal size of the context, using a template selected from modified two-line and modified three-line templates, in response to the two-line/three-line mode; and selecting the second context if an input image is smaller than the horizontal size of the context, and otherwise selecting the first context.

BRIEF DESCRIPTION OF THE DRAWINGS

The above objectives and advantages of the present invention will become more apparent by describing in detail preferred embodiments thereof with reference to the attached drawings in which:

FIG. 5 illustrates a modified two-line template register to be applied to each of the pixel context generators shown in FIG. 3;

FIG. 8 illustrates a three-template structure;

FIG. 9 is a circuit diagram of a context generation circuit according to another embodiment of the present invention;

FIG. 10 is a block diagram of the small image context generator shown in FIG. 9;

FIG. 11 illustrates a modified three-line template register applied to each of the pixel context generators shown in FIG. 10;

DESCRIPTION OF THE PREFERRED EMBODIMENTS

Figure 1:
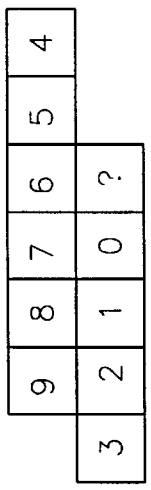
FIG. 1 is a block diagram illustrating the structure of a two-line template.

The structure of a two-line template based on a joint bi-level image experts group (JBIG) standard is shown in FIG. 1. Here, a pixel currently being processed is represented by a question mark symbol (?). This pixel is coded by adaptively applying a probability according to the values of 10 pixels from 0 through to 9, thereby generating a context. Here, a template can be called a window.

Figure 2:
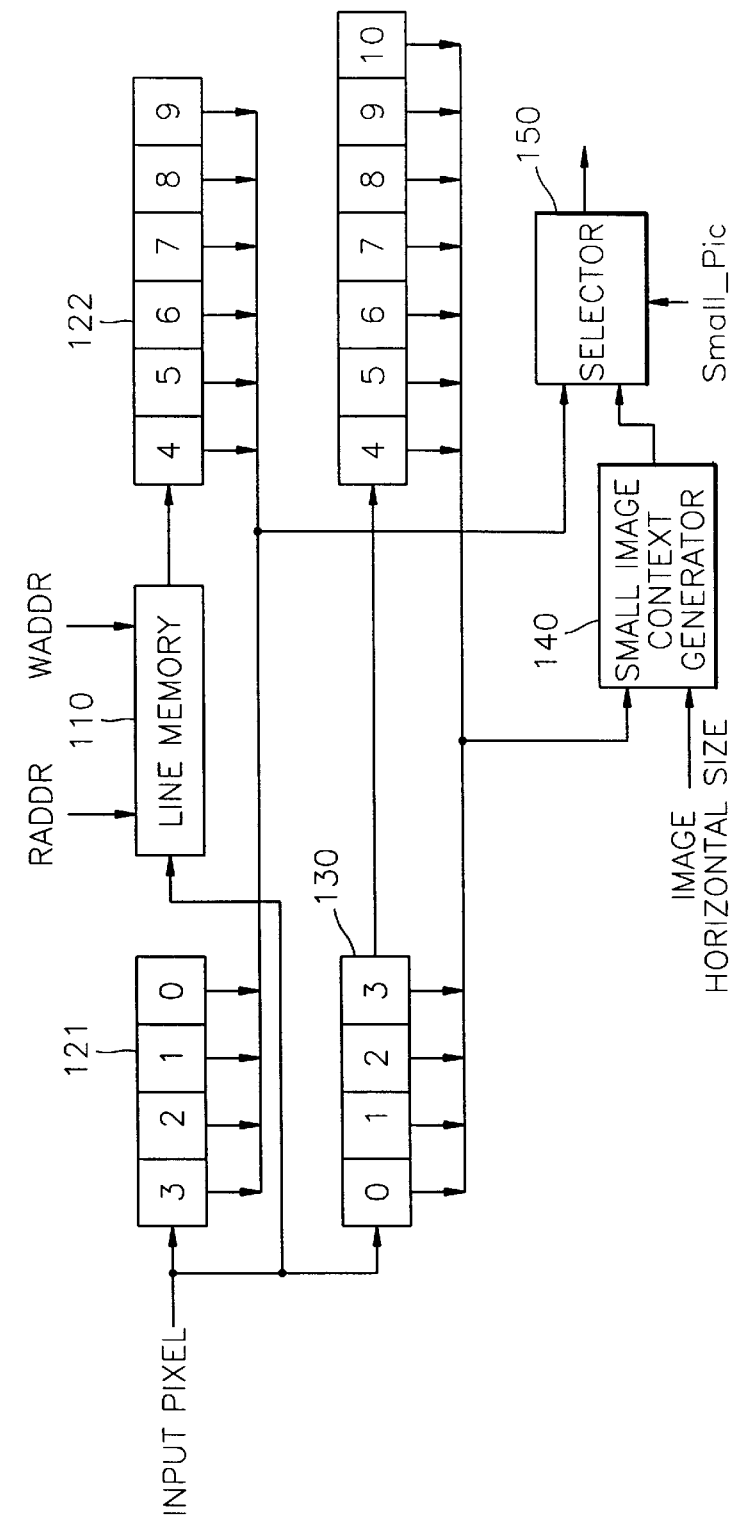
FIG. 2 is a circuit diagram illustrating a context generation circuit according to an embodiment of the present invention.

FIG. 2 is a circuit diagram of the two-line template context generation circuit according to an embodiment of the present invention.

Referring to FIG. 2, a single line memory 110 is controlled by a write address WADDR and a read address RADDR to support two lines. A context of an image having the horizontal pixel size that is larger than the context is generated by a general process using the line memory 110 and two-line template registers 121 and 122.

In order to process a small image having the horizontal number of pixels that is smaller than a context, a register 130, a small image context generator 140 and a selector 150 are additionally included.

That is, the selector 150 selects a small image context for a two-line template generated by the small image context generator 140, if an input screen is small enough that the horizontal number of pixels is smaller than a context, and otherwise selects a context generated by the registers 121 and 122, according to a small screen mode signal Small_Pic.

Figure 3:
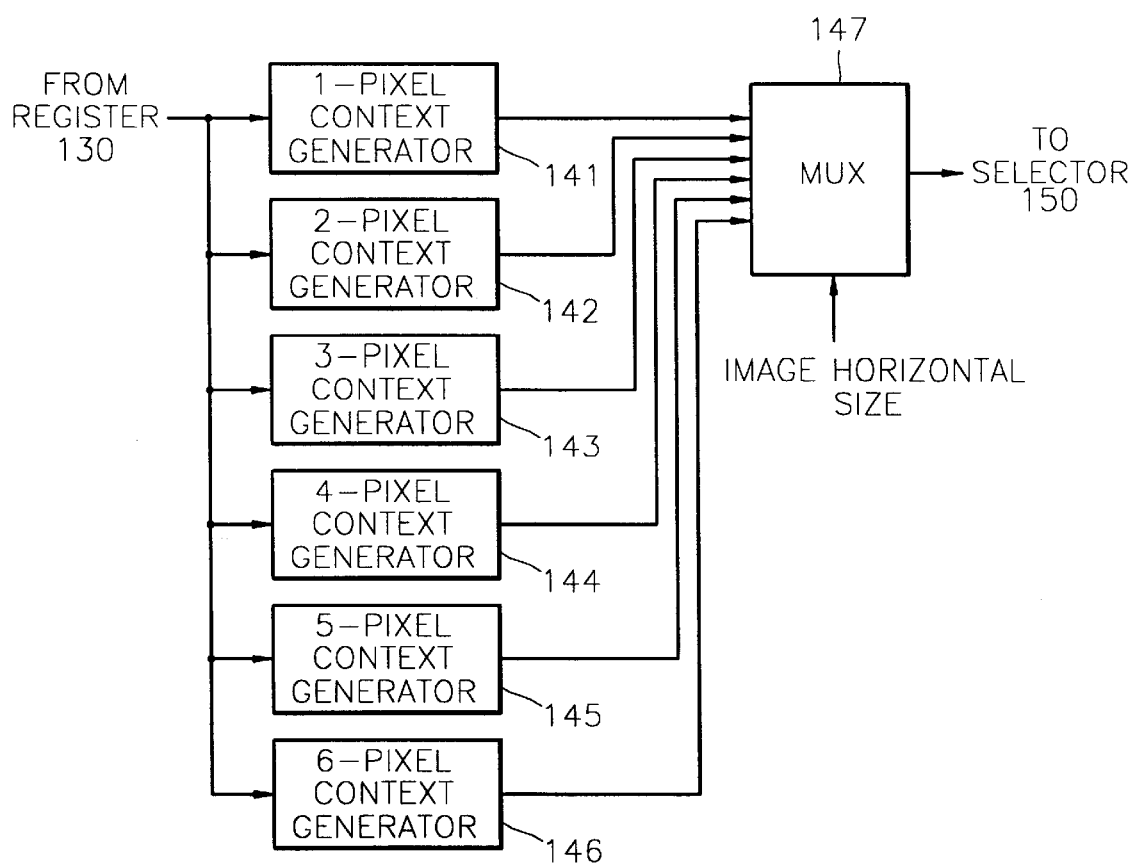
FIG. 3 is a block diagram illustrating a small image context generator shown in FIG. 2.

As shown in FIG. 3, the small image context generator 140 for the two-line template is comprised of one-pixel through six-pixel context generators 141 through 146 and a multiplexer 147 for selecting one of the outputs of the one-pixel to six-pixel context generators 141 to 146 according to the horizontal size of an image.

That is, the small image context generator 140 can process a small image having the horizontal size of up to six pixels, since the two-line template structure requires a maximum delay of six pixels as shown in FIG. 1. As to an image having more than six pixels horizontally, the general process using the line memory 110 and two-line template registers 121 and 122 is applied.

As an example, the operation of the one-pixel context generator 141 will now be described referring to FIGS. 4 and 5.

Figure 4:
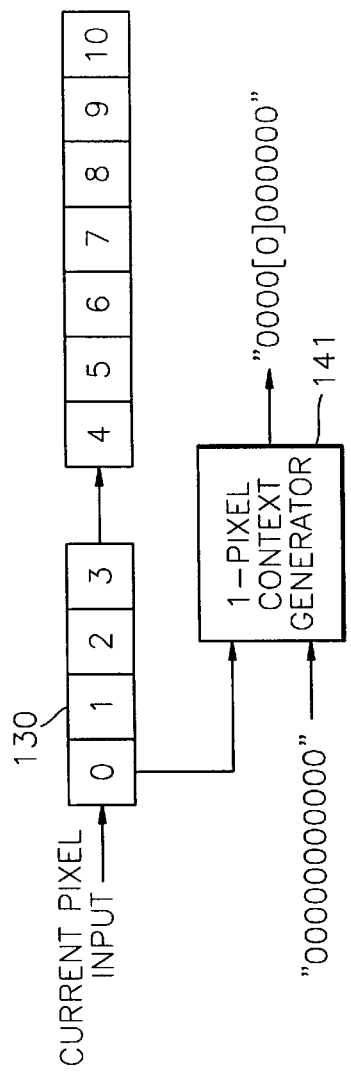
FIG. 4 illustrates the operation of a one-pixel context generator shown in FIG. 3.

Referring to FIG. 4, the one-pixel context generator 141 combines the numbers in a register 130 having previous pixel information with the position of a modified two-line template for generating a context of a small image, shown in FIG. 5. An arithmetic "zero" is inserted into a context having no previous pixel information, thereby generating a context having a horizontal size of one pixel. Here, each of the pixel context generators shown in FIG. 3 may be a controller, or can be comprised of a programmable logic array (PLA) or a read only memory (ROM).

In addition, the two-line template structure for an image having a large horizontal number of pixels shown in FIG. 1 requires ten outputs of a register, whereas the modified two-line template structure shown in FIG. 5 requires 11 outputs of the register to generate a context of a small image, because the delay amount of lines must be considered. Also, since the position numbers of the template shown in FIG. 5 are different from those of the register 130, each of the pixel context generators 141 to 146 combines the number of the register 130 with a template position with respect to a portion overlapping a current image, and thus generates a context.

Current pixel information indicated by a question mark symbol "?" shown in FIG. 5 is stored in a number 0 space of the register 130, and the pixel information previously stored in the number 0 space is stored in a number 1 space of the register 130. That is, the number 0 becomes the pixel information of a previous line, and the number 1 becomes the pixel information having a two-line delay.

Accordingly, the one pixel context generator 141 generates a context of a pixel on a first line as a preset initial value "00000000000", and generates a context for the pixels on the next line "0000[0]000000", in which a pixel value stored in the number 0 space of the register 130 is renewed at a context data position No. 6 on each line, since the pixel information on the previous line corresponds to a template position No. 6 shown in FIG. 5. In the [0], [ ] denotes a renewal, and 0 denotes the number of the register 130.

Figure 6:
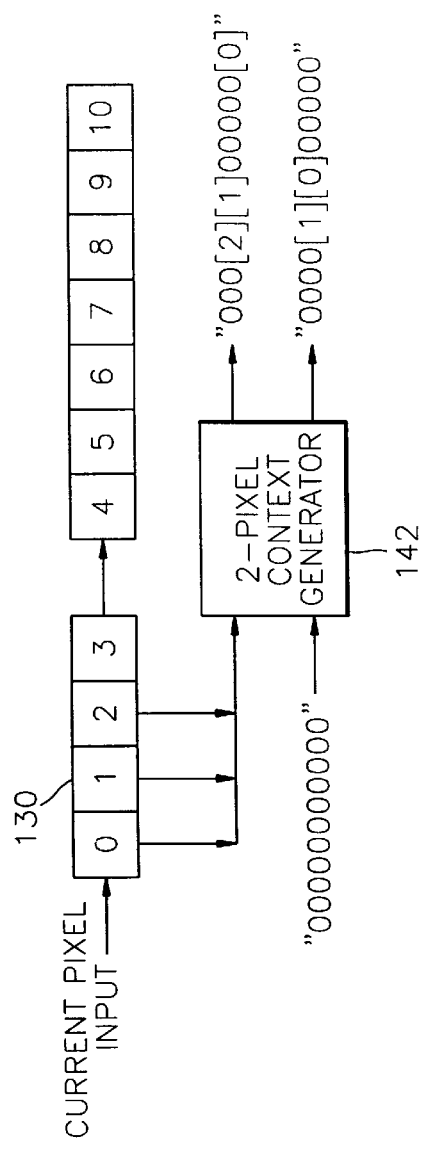
FIG. 6 illustrates the operation of a two-pixel context generator shown in FIG. 3.

FIG. 6 is a view illustrating the operation of the two pixel context generator 142 shown in FIG. 3. When the number of pixels is 2, a current pixel "?" is stored in the number 0 space of the register 130, and the pixel value previously stored in the number 0 is stored in the number 1 space. When the first pixel of the next line is input, the pixel value previously stored in the number 1 space is stored in the number 2 space of the register 130.

A context for the first pixel of each line is generated as "0000[1][0]00000" from the two-pixel context generator 142, and a context for the second pixel becomes "000[2][1]00000[0]". Here, a context of the first pixel of the first line is the initial value "00000000000".

Figure 7A:
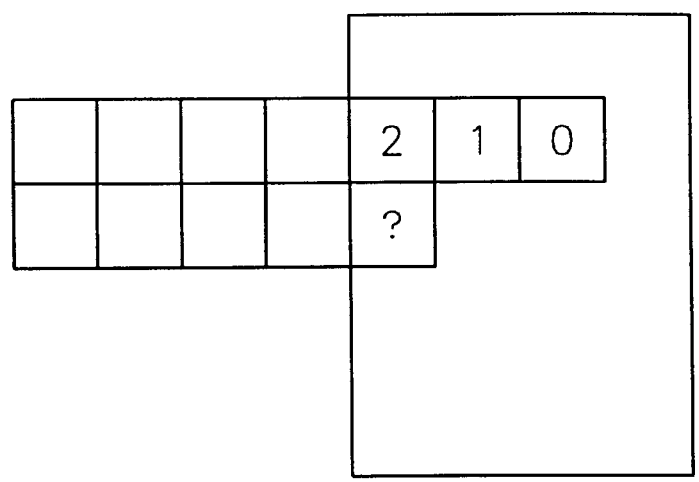
FIGS. 7A, 7B and 7C illustrate the numbers of a register used according to the position of a current pixel when the size of a horizontal screen is four.
Figure 7B:
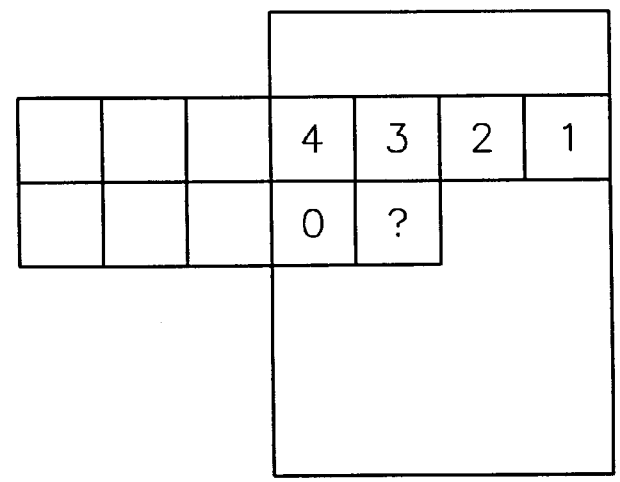
Figure 7C:
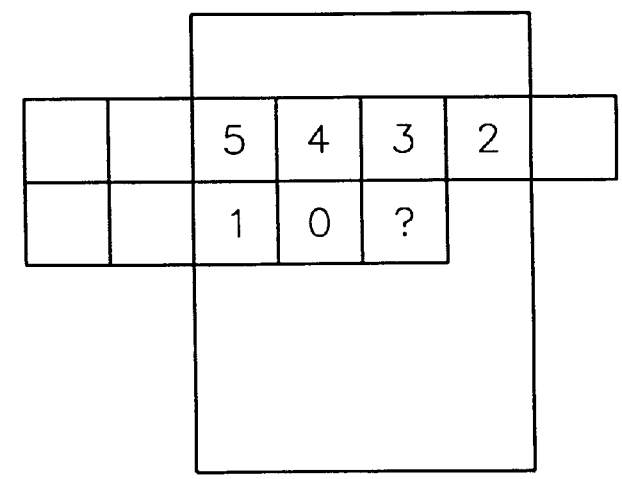

FIGS. 7A, 7B and 7C explain the numbers of the register 130 used when an image having a horizontal size of 4 is processed using the modified two-line template, in order to facilitate the understanding of the present invention.

Referring to FIGS. 7A through 7C input pixel information is stored in the register 130 shown in FIG. 2. Whenever the pixel information is moved by one pixel at a time, a modified template position overlapping an image is combined with the corresponding number of the register 130. A context into which "0" is inserted is generated at the position of a modified template which does not overlap the image.

The configuration of a JBIG template has a special rule with respect to a corner, and is prescribed to have a value "0" with respect to a portion having no previous pixel information.

Meanwhile, the structure of a three-line template based on the JBIG standard is shown in FIG. 8. Here, a pixel currently being processed is represented by a question mark symbol "?", and a probability is adaptively applied according to 10 pixel values corresponding to peripheral pixels from 0 to 9 to accomplish coding of the pixel "?", thereby generating a context.

FIG. 9 is a circuit diagram of a context generation circuit for such a three-line template according to an embodiment of the present invention. Referring to FIG. 9, a context of an image having the horizontal size which is larger than the context is generated by a general process using two line memories 210 and 220 and three-line template registers 231, 232 and 233 shown in FIG. 8 to support three lines.

A register 240 is included for an image smaller than the context, and the output of the register 240 is applied to a small image context generator 250. The small image context generator 250 generates 1-pixel to 5-pixel contexts according to the horizontal size of an image using the output of the register 240.

A selector 260 selects the context generated by the small image context generator 250 if an input pixel belongs to a small screen, and otherwise selects the context generated by the three-line template registers 231, 232 and 233, according to a small screen mode signal Small_Pic.

FIG. 10 is a block diagram of the three-line template small image context generator 250 shown in FIG. 9, which is comprised of one-pixel to five-pixel context generators 251 to 255 and a multiplexer 256 for selecting one of the outputs of the one-pixel to five-pixel context generators 251 to 255 according to the horizontal size of an image.

That is, the small image context generator 250 can process a small image having a horizontal size of at most five pixels, since the three-line template structure requires delay of at most five pixels as shown in FIG. 8. When an image has a horizontal size of more than five pixels, the context generation circuit follows a general context processing method using the line memories 210 and 220 and the three-line template registers 231, 232 and 233.

12 outputs of the register 240 are required in the modified three-line template structure for generating a small image context shown in FIG. 11, because the delay amount of lines must be considered.

For example, when the number of pixels is 1, after current pixel information "?" is input, it is stored in the number 0 space of the register 240, and a pixel value previously stored in the number 0 space is stored in the number 1 space. That is, the number 0 becomes the pixel information of a previous line, and the number 1 becomes the pixel information having a two-line delay.

Accordingly, the context of an image having one pixel generated from the one-pixel context generator 251 shown in FIG. 10 becomes "00[1]0000[0]0000", since the values of previous pixels corresponding to the modified three-line template position Nos. 4 and 9 are stored in the number 0 and 1 spaces.

When the number of pixels is 2, pixel values stored in the number 0 to 4 spaces of the register 240 are used. A context with respect to the first pixel of each line generated by the 2-pixel context generator 252 shown in FIG. 10 becomes "00[3][2]000[1][0]000", since the values of previous pixels corresponding to the modified three-line template position Nos. 3, 4, 8 and 9 are stored in the number 0, 1, 2 and 3 spaces. A context with respect to the second pixel of each line becomes "0[4][3]00[2][1]000[0]", since the values of previous pixels corresponding to the modified three-line template position Nos. 0, 4, 5, 9 and 10 are stored in the number 0, 1, 2, 3 and 4 spaces of the register 240.

Figure 12:
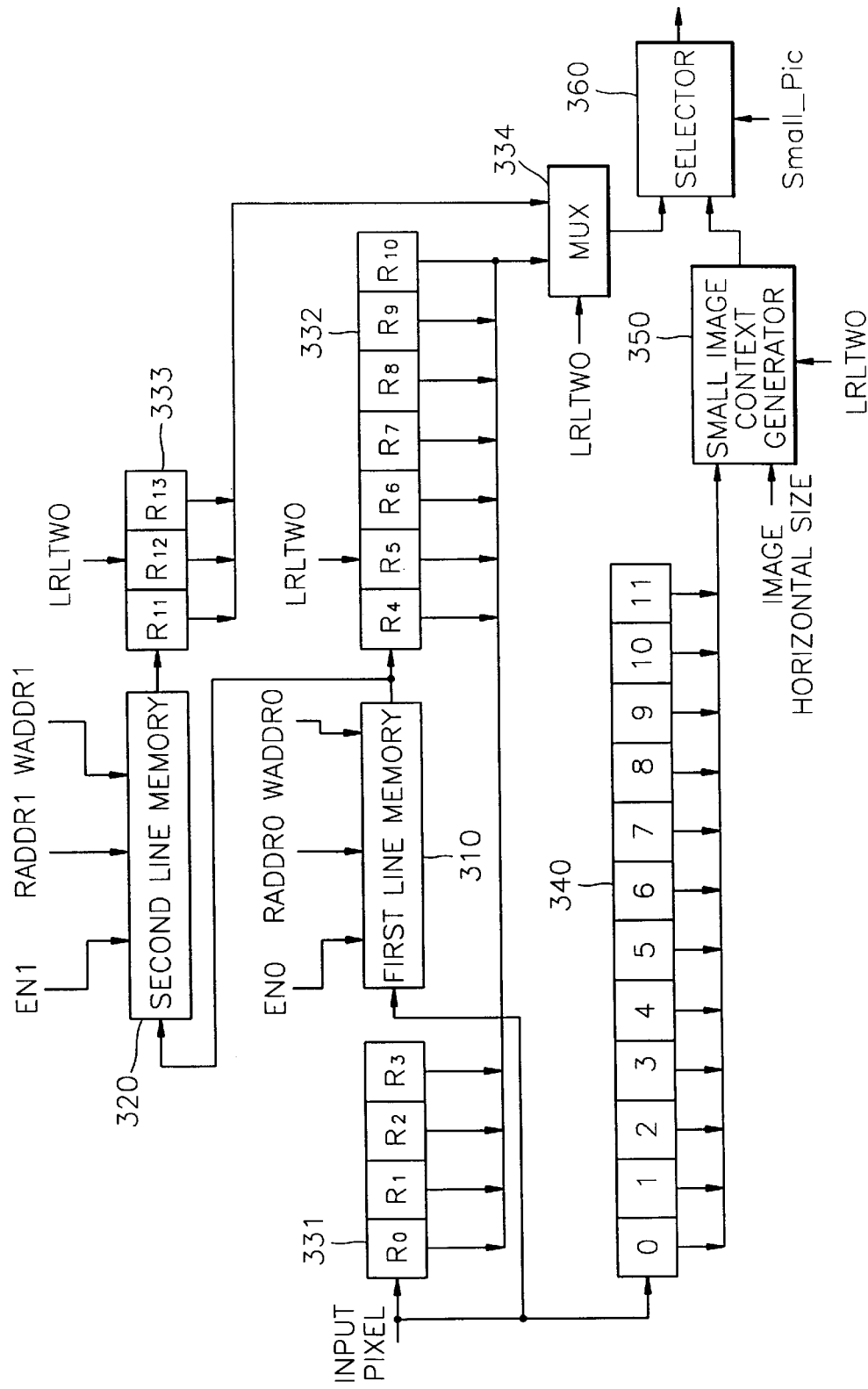
FIG. 12 is a circuit diagram of a context generation circuit according to still another embodiment of the present invention.

To use the two-line and three-line template context generation circuits in common as shown in FIG. 12 can reduce the amount of hardware of a circuit compared with when the two circuits are separately installed as shown in FIGS. 2 and 9.

Referring to FIG. 12, a signal LRLTWO representing either a two-line template context generation mode (abbreviated as a two-line mode) or a three-line template context generation mode (abbreviated as a three-line mode) is obtained from JBIG header information. The two-line/three-line mode signal LRLTWO is applied to resisters 332 and 334, a multiplexer 334 and a small image context generator 350.

In the two-line mode, only a first line memory 310 is operated by an enable signal EN0, and the four outputs $R_0$ to $R_3$ of a register 331 and seven outputs $R_4$ to $R_{10}$ of a register 332 connected to the output port of the first line memory 310 are all used. These outputs are applied to a selector 360 via a multiplexer 334 which operates according to the two-line/three-line mode signal LRLTWO. Also, the register 340 can use the pixel values stored in the number 0 to 10 spaces of the register 340. Here, the output of the register 333 is not used in the two-line mode.

In the three-line mode, two line memories 310 and 320 are operated by enable signals EN0 and EN1. The two outputs $R_0$ and $R_1$, the five outputs $R_5$ to $R_9$ of the register 332 connected to the first line memory 310, and the three outputs $R_{11}$ to $R_{13}$ of the register 333 connected to the output port of a second line memory 320 are applied to the selector 360 via the multiplexer 334 which operates according to the two-line/three-line mode signal LRLTWO. The twelve pixel values stored in the register 340 can all be used.

Here, in the generation of a context based on the three-template, the numbers of the registers 331, 332 and 333 are determined by the sequence of the template.

Figure 13:
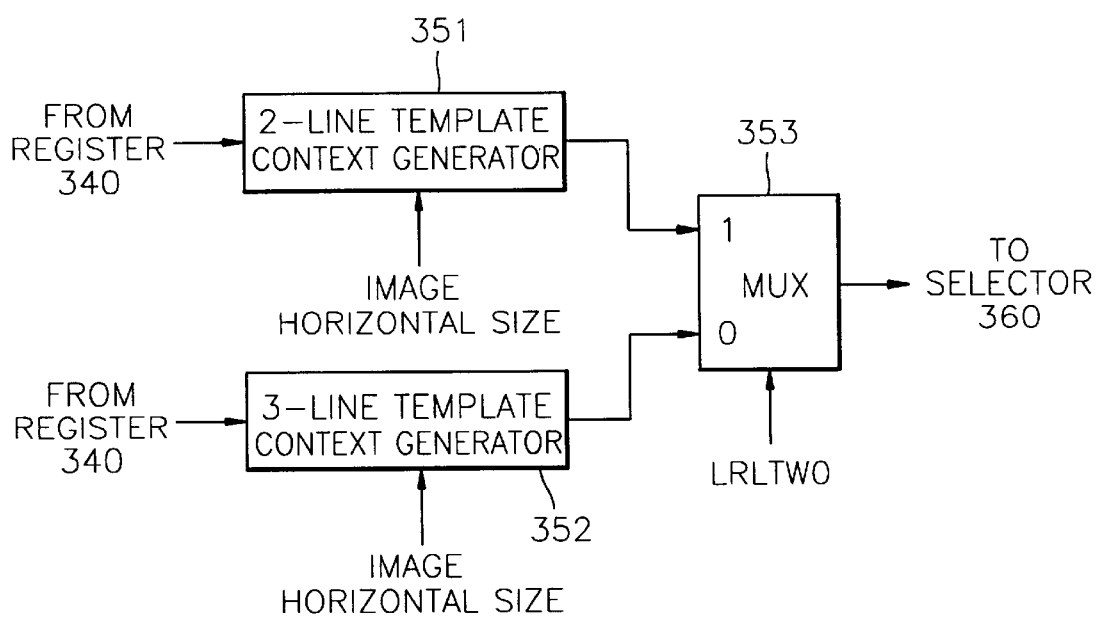
FIG. 13 is a block diagram of the small image context generator shown in FIG. 12.

In FIG. 13, which shows the small image context generator 350 in detail, a two-line template context generator 351 can have the configuration as shown in FIG. 3, and generates the contexts of images having a horizontal size of up to six pixels. A three-line template context generator 352 can have the configuration as shown in FIG. 10, and generates the contexts of images having a horizontal size of up to five pixels.

A multiplexer 353 selects a context generated by the two-line template context generator 351 in the two-line mode, and a context generated by the two-line template context generator 352 in the three-line mode. This is because the logic value of the two-line/three-line mode signal LRLTWO is 1 in the two-line mode, and 0 in the two-line mode.

The present invention is also applicable to JPEG and MPEG standards, which perform image processing having a predetermined rule with respect to corner processing, and is useful to an image that is smaller than a basic size 8 of a discrete cosine transform (DCT) block.

Thus, the present invention can be applied to an encoder and a decoder which apply the JBIG standard and also to systems using the JPEG and MPEG standards.

The present invention can effectively process an image having a small horizontal size, operate at high speed, and is reliable, regardless of the type of a built-in buffer memory (line memory).

What is claimed is:

1. A context generation circuit for a small screen comprising:

first generator for generating a first context of a pixel signal of an image that is larger than the horizontal size of the first context, using a first window selected from a plurality of first windows according to the position of an input pixel;

a second generator for generating a second context of a pixel signal of an image that is smaller than the horizontal size of the second context, using a second window selected from a plurality of second windows according to the position of the input pixel; and a selector for selecting the second context generated by the second generator if an input image is smaller than the horizontal size of the second context, and otherwise selecting the first context generated by the first generator.

2. The context generation circuit for a small screen as claimed in claim 1, wherein the plurality of first windows include at least two-line and three-line templates, and the plurality of second windows include at least modified two-line and modified three-line templates.

3. The context generation circuit for a small screen as claimed in claim 2, wherein the second generator combines the position of the modified two-line template which overlaps the input image with the corresponding space in a register, and generates the second context by inserting an arithmetic "0" into the position of the modified two-line template which does not overlap the input image.

4. The context generation circuit for a small screen as claimed in claim 2, wherein the second generator combines the position of the modified three-line template which overlaps the input image with the corresponding space in a register, and generates the second context by inserting an arithmetic "0" into the position of the modified three-line template which does not overlap the input image.

5. A context generation circuit for a small screen in an apparatus for processing a pixel signal of an image including a first generator for generating a first context of a pixel signal of an input image that is larger than the horizontal size of the first context using a two-line template, the circuit comprising:

a second generator for generating a second context of a pixel signal of an input image that is smaller than the horizontal size of the second context, using a modified two-line template; and a first selector for selecting the second context generated by the second generator, if an input image is a small screen mode having a predetermined horizontal number of pixels or less, and otherwise selecting the first context generated by the first generator.

6. The context generation circuit for a small screen as claimed in claim 5, wherein the second generator comprises:

a register for storing the value of a pixel overlapping the input image with modified two-line template;

a predetermined number of controllers for generating the second context of an input pixel using the value of a previous pixel stored in the register; and a second selector for selecting the output of one of the predetermined number of controllers, according to the horizontal size of the input image.

7. The context generation circuit for a small screen as claimed in claim 6, wherein the predetermined number of controllers each combine the position of the modified two-line template which overlaps the input image with a corresponding space in the register, and generate the second context by inserting an arithmetic "0" into the position of the modified two-line template which does not overlap the input image.

8. The context generation circuit for a small screen as claimed in claim 7, wherein each of the controllers can be replaced by either a programmable logic array or a memory.

9. A context generation circuit for a small screen in an apparatus for processing a pixel signal of an input image including a first generator for generating a first context of a pixel signal of an image that is larger than the horizontal size of the first context using a three-line template, the circuit comprising:

a second generator for generating a second context of a pixel signal of an image that is smaller than the horizontal size of the second context, using a modified three-line template; and a first selector for selecting the second context generated by the second generator, if the input image is a small screen mode having a predetermined horizontal number of pixels or less, and otherwise selecting the first context generated by the first generator.

10. The context generation circuit for a small screen as claimed in claim 9, wherein the second generator comprises:

a register for storing the value of a pixel overlapping the input image with modified three-line template;

a predetermined number of controllers for generating the second context of an input pixel using the value of a previous pixel stored in the register; and a second selector for selecting the output of one of the predetermined number of controllers, according to the horizontal size of the input image.

11. The context generation circuit for a small screen as claimed in claim 10, wherein the predetermined number of controllers each combine the position of the modified three-line template which overlaps the input image with a corresponding space in the register, and generate the second context by inserting an arithmetic "0" into the position of the modified three-line template which does not overlap the input image.

12. The context generation circuit for a small screen as claimed in claim 11, wherein each of the controllers can be replaced by either a programmable logic array or a memory.

13. A context generation circuit for a small screen comprising:

first and second buffer memories for operating according to a two-line/three-line template context generation mode signal (two-line/three-line mode signal);

a first register connected to the input and output ports of the first buffer memory, for supplying a first context of a pixel signal of an input image that is larger than the horizontal size of the first context in two-line and three-line modes;

a second register connected to the output port of the second buffer memory, for supplying a second context of a pixel signal of an input image that is larger than the horizontal size of the second context in a three-line mode;

a first selector for selecting the output of the first register in a two-line mode and the outputs of the first and second registers in a three-line mode, according to the two-line/three-line mode signal;

a third register for storing the value of a pixel overlapping the input image with a modified two-line template in a two-line mode, and storing the value of a pixel overlapping the input image with a modified three-line template in a three-line mode, using the modified two-line and three-line templates for an image that is smaller than the horizontal size of a third context;

a generator for generating two-line and three-line template contexts of a pixel signal of an image that is smaller than the horizontal size of a fourth context using the value of a pixel stored in the third register; and a second selector for selecting the context generated by the generator if an input image is a mode for a screen having a predetermined horizontal number of pixels or less, and otherwise selecting the context supplied by the first selector.

14. The context generation circuit for a small screen as claimed in claim 13, wherein the generator comprises:

a first generator for generating the two-line template context of a pixel signal of an image that is smaller than the horizontal size of a context, using the modified two-line template;

a second generator for generating the three-line template context of a pixel signal of an image that is smaller than the horizontal size of a second context, using the modified three-line template; and a third selector for selecting the two-line template context generated by the first generator in a two-line mode and the three-line template context generated by the second generator in a three-line mode, according to the two-line/three-line mode signal.

15. The context generation circuit for a small screen as claimed in claim 14, wherein the first generator combines the position of the modified two-line template which overlaps the input image with the corresponding space in the third register, and generates the two-line template context by inserting an arithmetic "0" into the position of the modified two-line template which does not overlap the input image.

16. The context generation circuit for a small screen as claimed in claim 14, wherein the second generator combines the position of the modified three-line template which overlaps the input image with the corresponding space in the third register, and generates the three-line template context by inserting an arithmetic "0" into the position of the modified three-line template which does not overlap the input image.

17. A method for generating a context for a small screen comprising the steps of:

(a) generating a first context of a pixel signal of an image that is larger than the horizontal size of a context, using a template selected from two-line and three-line templates, in response to a two-line/three-line mode;

(b) generating a second context of a pixel signal of an image that is smaller than the horizontal size of the second context, using a template selected from modified two-line and modified three-line templates, in response to the two-line/three-line mode; and (c) selecting the second context if an input image is smaller than the horizontal size of the second context, and otherwise selecting the first context.

* * * * *